United States Patent
Park et al.

(10) Patent No.: US 12,462,981 B2
(45) Date of Patent: Nov. 4, 2025

(54) MULTILAYER ELECTRONIC COMPONENT

(71) Applicant: SAMSUNG ELECTRO-MECHANICS CO., LTD., Suwon-si (KR)

(72) Inventors: Jin Soo Park, Suwon-si (KR); Byung Jun Jeon, Suwon-si (KR); Chul Seung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 199 days.

(21) Appl. No.: 18/384,972

(22) Filed: Oct. 30, 2023

(65) Prior Publication Data

US 2024/0203657 A1   Jun. 20, 2024

(30) Foreign Application Priority Data

Dec. 15, 2022   (KR) .......................... 10-2022-0175915

(51) Int. Cl.
   *H01G 4/232*   (2006.01)
   *H01G 4/30*    (2006.01)
   H01G 4/012     (2006.01)
   H01G 4/12      (2006.01)

(52) U.S. Cl.
   CPC ............. *H01G 4/2325* (2013.01); *H01G 4/30* (2013.01); *H01G 4/012* (2013.01); *H01G 4/1227* (2013.01)

(58) Field of Classification Search
   None
   See application file for complete search history.

(56) References Cited

U.S. PATENT DOCUMENTS

| | | | |
|---|---|---|---|
| 10,580,579 B2 * | 3/2020 | Song ....................... | H01G 4/232 |
| 11,587,735 B2 * | 2/2023 | Park ....................... | H01G 4/248 |
| 12,170,170 B2 * | 12/2024 | Kim ........................ | H01G 4/30 |

(Continued)

FOREIGN PATENT DOCUMENTS

| | | | |
|---|---|---|---|
| JP | 2010-118499 A | 5/2010 | |
| JP | 2012-009556 A | 1/2012 | |

(Continued)

*Primary Examiner* — Dion R. Ferguson
(74) *Attorney, Agent, or Firm* — MORGAN, LEWIS & BOCKIUS LLP

(57) ABSTRACT

A multilayer electronic component includes a body including a dielectric layer and first and second internal electrodes and including first and second surfaces, third and fourth surfaces, and fifth and sixth surfaces, a first external electrode including a 1-1-th electrode layer disposed on the third surface, and a 1-2-th electrode layer disposed on the first and second surfaces, a second external electrode including a 2-1-th electrode layer disposed on the fourth surface, and a 2-2-th electrode layer disposed on the first and second surfaces, wherein $S_{1-2} > S_{1-1}$, $T_{1-2} \leq 8$ μm, $S_{2-2} > S_{2-1}$, and $T_{2-2} \leq 8$ μm where based on a cross section of the first and second external electrodes, $S_{1-1}$, $S_{1-2}$, $S_{2-1}$, $S_{2-2}$ are fractions of an area occupied by glass in the 1-1-th, 1-2-th, 2-1-th, and 2-2-th electrode layers, respectively, $T_{1-2}$ and $T_{2-2}$ are thicknesses of the 1-2-th and 2-2-th electrode layers, respectively.

13 Claims, 6 Drawing Sheets

(56) References Cited

U.S. PATENT DOCUMENTS

| | | | |
|---|---|---|---|
| 2009/0226705 A1* | 9/2009 | Motoki | H01G 4/30 |
| | | | 428/323 |
| 2010/0118467 A1 | 5/2010 | Takeuchi et al. | |
| 2013/0120898 A1* | 5/2013 | Park | H01G 4/30 |
| | | | 252/514 |
| 2015/0223340 A1* | 8/2015 | Jung | H01G 4/008 |
| | | | 156/89.12 |
| 2018/0114644 A1* | 4/2018 | Sugita | H01G 4/12 |
| 2020/0152387 A1* | 5/2020 | Takeuchi | H01G 4/1245 |
| 2021/0343475 A1* | 11/2021 | Takeuchi | H01G 4/1209 |
| 2022/0270826 A1* | 8/2022 | Tanaka | H01G 4/1227 |
| 2023/0162921 A1* | 5/2023 | Kang | H01G 4/012 |
| | | | 361/301.4 |
| 2024/0177933 A1* | 5/2024 | Lee | H01G 4/2325 |
| 2024/0177934 A1* | 5/2024 | Park | H01G 4/008 |
| 2024/0203657 A1* | 6/2024 | Park | H01G 4/12 |
| 2025/0166912 A1* | 5/2025 | Kang | H01G 4/2325 |

FOREIGN PATENT DOCUMENTS

| | | | | |
|---|---|---|---|---|
| JP | 2021176181 A | * | 11/2021 | H01G 4/30 |
| JP | 2022-129225 A | | 9/2022 | |

* cited by examiner

MULTILAYER ELECTRONIC COMPONENT

CROSS-REFERENCE TO RELATED APPLICATION (S)

This application claims benefit of priority to Korean Patent Application No. 10-2022-0175915 filed on Dec. 15, 2022 in the Korean Intellectual Property Office, the present disclosure of which is incorporated herein by reference in its entirety.

BACKGROUND

1. Field

The present disclosure relates to a multilayer electronic component.

2. Description of Related Art

A multilayer ceramic capacitor (MLCC), one of multilayer electronic components, may be a chip-type condenser which is mounted on a printed circuit board of various electronic products, such as an imaging device such as a liquid crystal display (LCD) or a plasma display panel (PDP), a computer, a smartphone or a mobile phone, to charge or discharge electricity therein or therefrom.

The multilayer ceramic capacitor is small, has high capacitance, and is easily mounted on a circuit board, and may thus be used in various electronic apparatuses, and there has been an increasing demand for the multilayer ceramic capacitor to have a smaller size and higher capacitance as each of various electronic devices such as a computer and a mobile device has a smaller size and higher output. In accordance with this trend of the smaller size and the higher performance, it has become important for the multilayer ceramic capacitor to have an increased capacitance per unit volume.

An external electrode of the multilayer ceramic capacitor may generally include a metal for its electrical connection with an internal electrode and glass to secure its coupling strength with a body. Here, glass included in the external electrode tends to be moved to a surface of a body where the internal and external electrodes are in contact with each other during a firing process. In this case, the metals respectively included in the internal electrode and the external electrode may be prevented to form an ally to thus lower the high-temperature insulation resistance (IR) characteristic and moisture resistance reliability of the multilayer electronic component, and glass fails to be sufficiently dispersed in the external electrode disposed on a side surface of the body to thus lower a bonding strength between the body and the external electrode.

Meanwhile, when the external electrode disposed on the side surface of the body has an excessive thickness, the capacitance per unit volume of the multilayer electronic component may be lower, and residual carbon occurring during firing may fail to be externally discharged, thus causing a blister on the external electrode. In addition, glass may be eluted to an outer surface of the external electrode when a large amount of glass is added to the external electrode disposed on the side surface of the body in order to improve the bonding strength between the body and external electrode.

Therefore, there is a need to study a structure of the external electrode that may prevent the blister caused by the residual carbon during the firing as well as the elution of glass while improving the moisture resistance reliability and the bonding strength between the body and external electrode of the multilayer ceramic capacitor.

SUMMARY

An aspect of the present disclosure may provide a multilayer electronic component with improved moisture resistance reliability.

Another aspect of the present disclosure may provide a multilayer electronic component with an improved bonding strength between its body and an external electrode.

Another aspect of the present disclosure may provide a multilayer electronic component without a blister of an external electrode or elution of glass to an outer surface of the external electrode.

However, the present disclosure is not limited to the description above, and may be more readily understood in the description of exemplary embodiments of the present disclosure.

According to an aspect of the present disclosure, a multilayer electronic component may include: a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction, a first external electrode including a 1-1-th electrode layer disposed on the third surface, and a 1-2-th electrode layer disposed on the first and second surfaces to be connected to the 1-1-th electrode layer and including glass, and a second external electrode including a 2-1-th electrode layer disposed on the fourth surface, and a 2-2-th electrode layer disposed on the first and second surfaces to be connected to the 2-1-th electrode layer and including glass, wherein $S_{1-2} > S_{1-1}$, $T_{1-2} \leq 8$ μm, $S_{2-2} > S_{2-1}$, and $T_{2-2} \leq 8$ μm where based on a cross section of the first and second external electrode in the first and second directions, S1-1 is a fraction of an area occupied by the glass in the 1-1-th electrode layer, S1-2 is the fraction of an area occupied by the glass in the 1-2-th electrode layer, T1-2 is a thickness of a central region of the 1-2-th electrode layer in the second direction, S2-1 is the fraction of an area occupied by the glass in the 2-1-th electrode layer, S2-2 is the fraction of an area occupied by the glass in the 2-2-th electrode layer, and T2-2 is a thickness of a central region of the 2-2-th electrode layer in the second direction.

According to another aspect of the present disclosure, a multilayer electronic component may include: a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction, a first external electrode including a 1-1-th electrode layer disposed on the third surface, and a 1-2-th electrode layer disposed on the first and second surfaces to be connected to the 1-1-th electrode layer and including glass, and a second external electrode including a 2-1-th electrode layer disposed on the fourth surface, and a 2-2-th electrode layer disposed on the first and second surfaces to be connected to the 2-1-th electrode layer and including glass, wherein 10%<S1-

2≤30%, S1-2>S1-1, 10%<S2-2≤30%, and S2-2>S2-1 where based on a cross section of the first and second external electrode in the first and second directions, S1-1 is a fraction of an area occupied by the glass in the 1-1-th electrode layer, S1-2 is the fraction of an area occupied by the glass in the 1-2-th electrode layer, S2-1 is the fraction of an area occupied by the glass in the 2-1-th electrode layer, and S2-2 is the fraction of an area occupied by the glass in the 2-2-th electrode layer.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
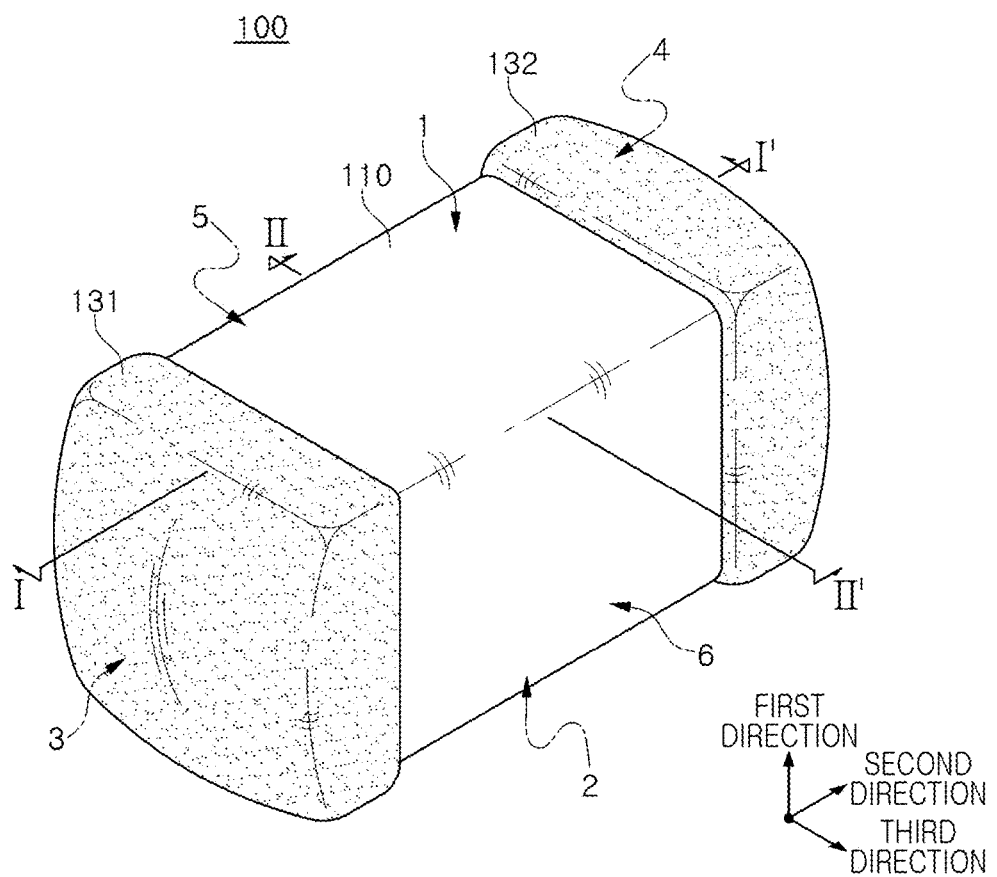
FIG. 1 is a perspective view schematically showing a multilayer electronic component according to an exemplary embodiment of the present disclosure.

Hereinafter, exemplary embodiments of the present disclosure will now be described in detail with reference to the accompanying drawings.

In the drawings, a first direction may indicate a thickness (T) direction, a second direction may indicate a length (L) direction, and a third direction may indicate a width (W) direction.

FIG. 1 is a perspective view schematically showing a multilayer electronic component according to an exemplary embodiment of the present disclosure.

Figure 2:
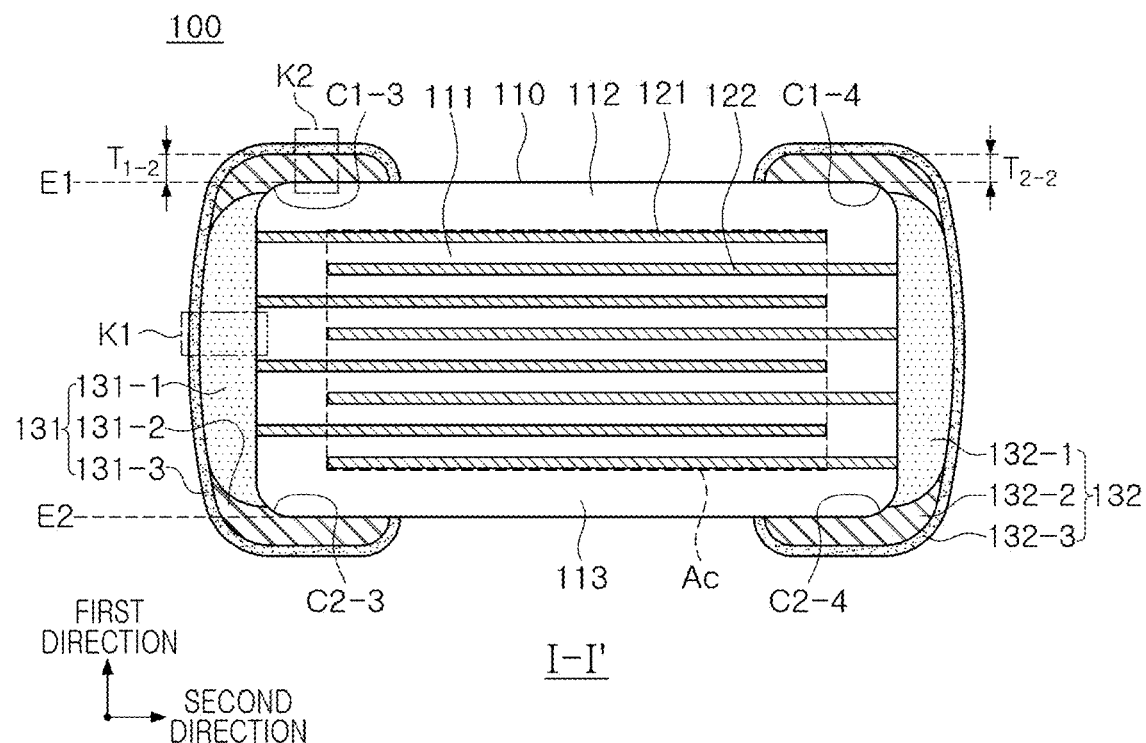
FIG. 2 is a cross-sectional view schematically showing a cut cross section I-I' of FIG. 1.

FIG. 2 is a cross-sectional view schematically showing a cut cross section I-I' of FIG. 1.

Figure 3:
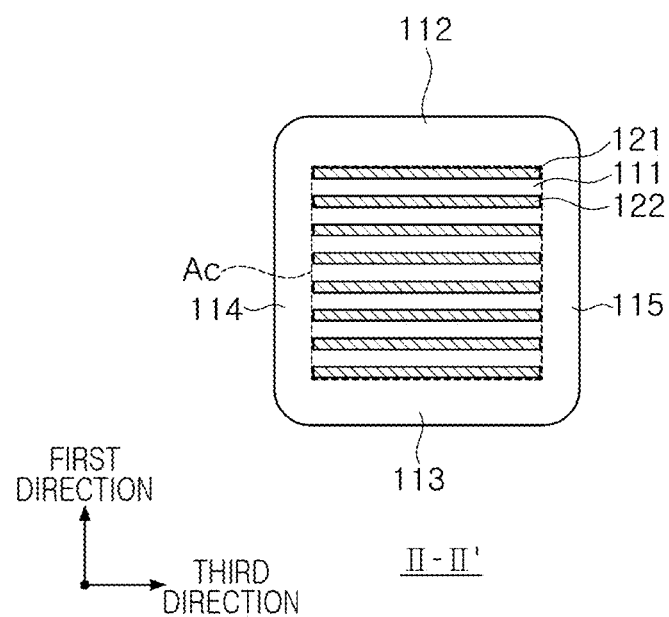
FIG. 3 is a cross-sectional view schematically showing a cut cross section II-II' of FIG. 1.

FIG. 3 is a cross-sectional view schematically showing a cut cross section II-II' of FIG. 1.

Figure 4:
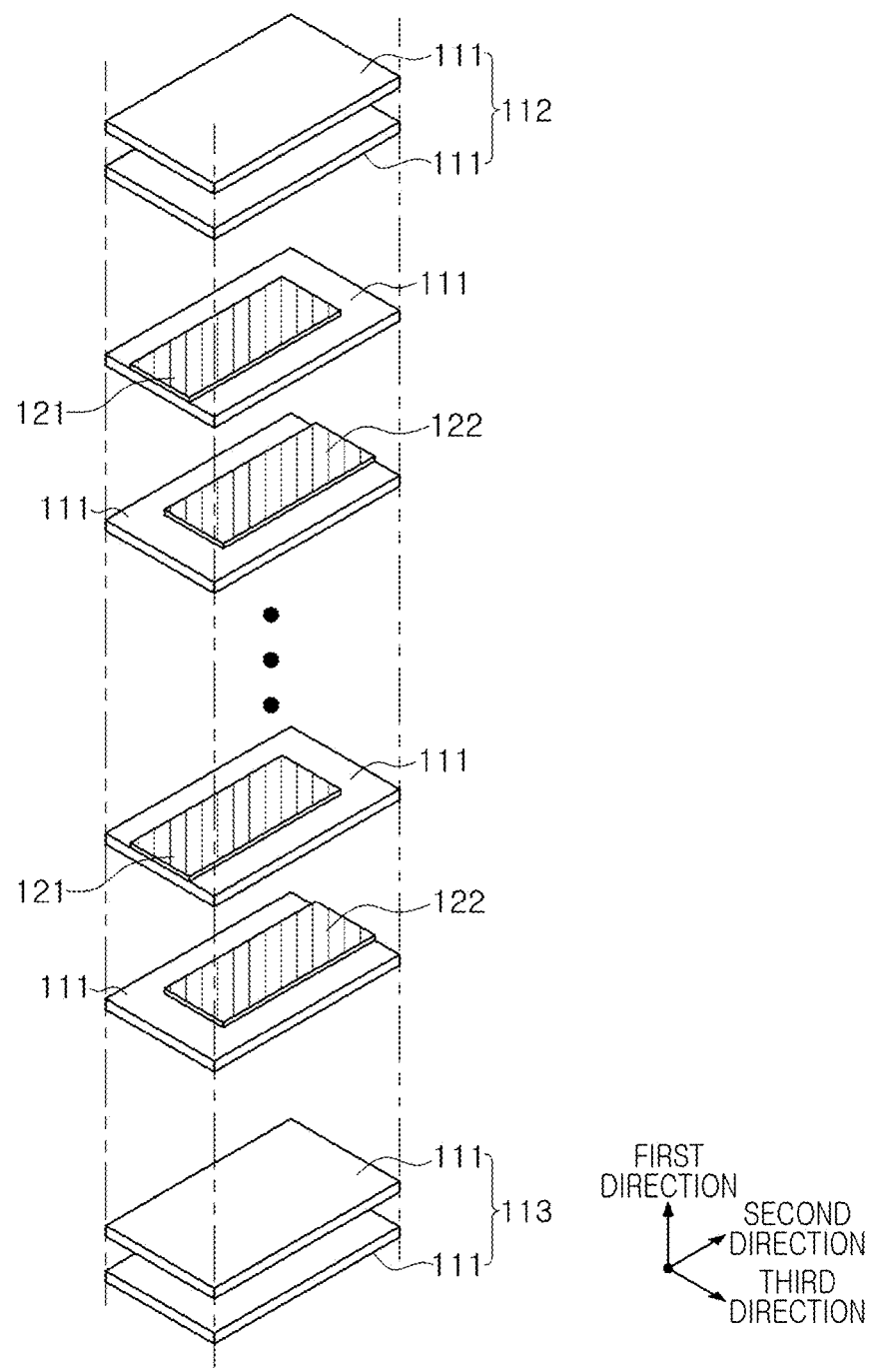
FIG. 4 is an exploded perspective view schematically showing an exploded body of the multilayer electronic component according to an exemplary embodiment of the present disclosure.

FIG. 4 is an exploded perspective view schematically showing an exploded body of the multilayer electronic component according to an exemplary embodiment of the present disclosure.

Figure 5:
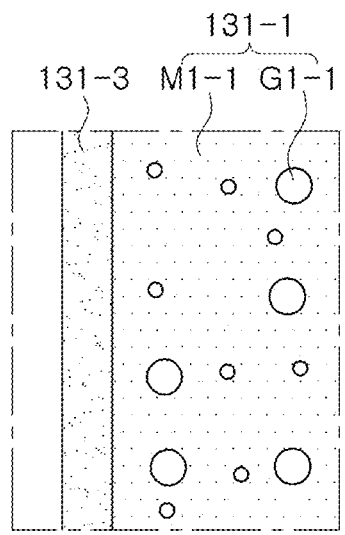
FIG. 5 is an enlarged view of a region K1 of FIG. 2.

FIG. 5 is an enlarged view of a region K1 of FIG. 2.

Figure 6:
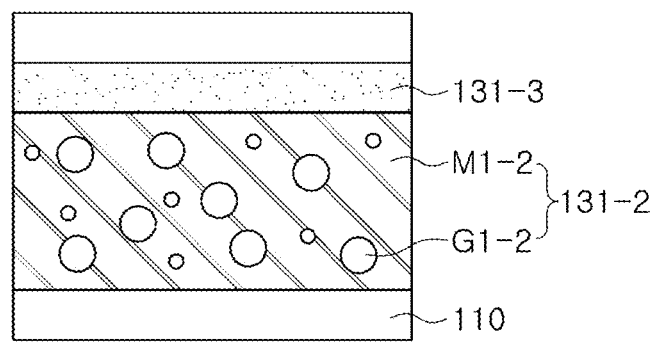
FIG. 6 is an enlarged view of a region K2 of FIG. 2.

FIG. 6 is an enlarged view of a region K2 of FIG. 2.

Referring to FIGS. 1 through 6, a multilayer electronic component 100 according to an exemplary embodiment of the present disclosure may include: a body 110 including a dielectric layer 111 and first and second internal electrodes 121 and 122 disposed with the dielectric layer 111 interposed therebetween and including first and second surfaces 1 and 2 opposing each other in a first direction, third and fourth surfaces 3 and 4 connected to the first and second surfaces 1 and 2 and opposing each other in the second direction, and fifth and sixth surfaces 5 and 6 connected to the first to fourth surfaces 1 to 4 and opposing each other in the third direction, a first external electrode 131 including a 1-1-th electrode layer 131-1 disposed on the third surface 3 and a 1-2-th electrode layer 131-2 disposed on the first and second surfaces 1 and 2 to be connected to the 1-1-th electrode layer and including glass, and a second external electrode 132 including a 2-1-th electrode layer 132-1 disposed on the fourth surface 4, and a 2-2-th electrode layer 132-2 disposed on the first and second surfaces 1 and 2 to be connected to the 2-1-th electrode layer and including glass, wherein $S_{1-2}>S_{1-1}$, $T_{1-2}≤8$ μm, $S_{2-2}>S_{2-1}$, and $T_{2-2}≤8$ μm where based on a cross section of the first and second external electrode in the first and second directions, $S_{1-1}$ is a fraction of an area occupied by the glass in the 1-1-th electrode layer, $S_{1-2}$ is the fraction of an area occupied by the glass in the 1-2-th electrode layer, $T_{1-2}$ is a thickness of a central region of the 1-2-th electrode layer in the second direction, $S_{2-1}$ is the fraction of an area occupied by the glass in the 2-1-th electrode layer, $S_{2-2}$ is the fraction of an area occupied by the glass in the 2-2-th electrode layer, and $T_{2-2}$ is a thickness of a central region of the 2-2-th electrode layer in the second direction.

As described above, metals respectively included in the internal electrode and external electrode may be prevented to form an alloy, thus lowering moisture resistance reliability of multilayer electronic component when the fraction of an area occupied by glass is excessive in the 1-1-th electrode layer 131-1 and the 2-1-th electrode layer 132-1, and a bonding strength between the body and the external electrode may be lower when the fraction of an area occupied by glass is low in the 1-2-th electrode layer 131-2 and the 2-2-th electrode layer 132-2 disposed on the first and second surfaces 1 and 2 of the body.

In addition, a blister defect may occur on the external electrode as residual carbon occurring in glass during firing fails to be externally discharged when the central region of the 1-2-th electrode layer 131-2 and the 2-2-th electrode layer 132-2 in the second direction, having a larger area fraction, has an excessive thickness.

On the other hand, the multilayer electronic component 100 according to an exemplary embodiment of the present disclosure may satisfy $S_{1-2}>S_{1-1}$, and $S_{2-2}>S_{2-1}$, to allow the metals included in the internal electrode, the 1-1-th electrode layer 131-1, and the 2-1-th electrode layer 132-1 to easily form an alloy, and prevent external moisture from permeating into the internal electrodes 121 and 122 through glass included in the 1-1-th electrode layer 131-1 and the 2-1-th electrode layer 132-1, thereby improving the moisture resistance reliability of the multilayer electronic component, and the bonding strength between the body and the external electrode.

The multilayer electronic component 100 may also satisfy $T_{1-2}≤8$ μm and $T_{2-2}≤8$ μm to allow residual carbon occurring in glass during the firing to be externally discharged easily, thereby preventing the blister defect from occurring on the external electrode.

Hereinafter, the description more specifically describes each component included in the multilayer electronic component 100 according to an exemplary embodiment of the present disclosure.

The body 110 is not limited to a particular shape, and may have a hexahedral shape or a shape similar to the hexahedral shape, as shown in the drawings. The body 110 may not have the hexahedron shape having perfectly straight lines because ceramic powders included in the body 110 may be contracted during sintering the body or its edge may be polished. However, the body 110 may have the substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first to fourth surfaces 1, 2, 3 and 4, and opposing each other in the third direction.

The body 110 may include a 1-3-th corner C1-3 connecting the first surface 1 and the third surface 3 to each other, a 1-4-th corner C1-4 connecting the first surface and the fourth surface 4 to each other, a 2-3-th corner C2-3 connecting the second surface 2 and the third surface 3 to each other, and a 2-4-th corner C2-4 connecting the second surface 2 and the fourth surface 4 to each other. In addition, the body 110 may have a 1-5-th corner connecting the first surface 1 and the fifth surface 5 to each other, a 1-6-th corner connecting the first surface 1 and the sixth surface 6 to each other, a 2-5-th corner connecting the second surface 2 and the fifth surface 5 to each other, and a 2-6-th corner connecting the second surface 2 and the sixth surface 6 to each other. The corner may have a round shape by rounding the corner connecting the respective surfaces of the body 110 to each other by performing a separate process. The first to sixth surfaces 1 to 6 of the body 110 may be generally flat surfaces, and non-flat regions may be the corners.

The body 110 may include the dielectric layer 111 and the internal electrodes 121 and 122, which are alternately stacked. The plurality of dielectric layers 111 included in the body 110 may be in a sintered state, and adjacent dielectric layers 111 may be integrated with each other so that boundaries therebetween are not readily apparent without using a scanning electron microscope (SEM).

The dielectric layer 111 may be formed by preparing a ceramic slurry including ceramic powders, an organic solvent and a binder, applying and drying the slurry on a carrier film to prepare a ceramic green sheet, and then sintering the ceramic green sheet. The ceramic powders are not particularly limited as long as the powders may obtain sufficient capacitance, and may use, for example, barium titanate-based ($BaTiO_3$)-based powder.

An average thickness of the dielectric layer may not need to be particularly limited. Meanwhile, the dielectric layer 111 may be required to have a smaller thickness to increase the number of layers in order to achieve the smaller size and higher capacitance of the multilayer electronic component 100. However, as the dielectric layer 111 has the smaller thickness, the multilayer electronic component may have lower reliability, and deterioration of insulation resistance may easily occur in the dielectric layer.

On the other hand, the multilayer electronic component according to an exemplary embodiment of the present disclosure may satisfy $S_{1-2}>S_{1-1}$, $T_{1-2}\leq 8$ μm, $S_{2-2}>S_{2-1}$, and $T_{2-2}\leq 8$ μm μm to prevent external moisture from permeating into the internal electrodes 121 and 122 through glass included in the 1-1-th electrode layer 131-1 and the 2-1-th electrode layer 132-1, thereby improving the moisture resistance reliability of the multilayer electronic component, and the bonding strength between the body and the external electrode through the 1-2-th electrode layer 131-2 and the 2-2-th electrode layer 132-2 having a higher area fraction of glass. In this way, it is possible to secure the moisture resistance reliability of the multilayer electronic component even when the average thickness of the dielectric layer 111 is 0.4 μm or less.

Here, the thickness of the dielectric layer 111 may indicate the average thickness of the dielectric layers 111 disposed between the internal electrodes 121 and 122. The average thickness of the dielectric layer 111 may be measured by scanning cross sections of the body 110 in the first and second directions by using the scanning electron microscope (SEM) with a magnification of 10,000. In more detail, an average thickness value of the dielectric layer 111 may be obtained by averaging the thicknesses of one dielectric layer measured at a plurality of points, for example, at thirty equally spaced points in the second direction. The thirty equally spaced points may be designated in a capacitance formation portion AC described below. In addition, it is possible to obtain a more general average thickness of the dielectric layer 111 when measuring its average value by extending a measurement target of the average value to ten dielectric layers 111.

The internal electrodes 121 and 122 may be alternately disposed with the dielectric layer 111, and for example, the first internal electrode 121 and the second internal electrode 122, which are a pair of electrodes having different polarities, may be disposed to oppose each other while having the dielectric layer 111 interposed therebetween. The plurality of first internal electrodes 121 and the plurality of second internal electrodes 122 may be electrically isolated from each other by the dielectric layer 111 interposed therebetween.

Each of the plurality of first internal electrodes 121 may be spaced apart from the fourth surface 4 and connected to the third surface 3. In addition, each of the plurality of second internal electrodes 122 may be spaced apart from the third surface 3 and connected to the fourth surface 4.

A conductive metal included in the internal electrodes 121 and 122 may be at least one of nickel (Ni), copper (Cu), palladium (Pd), silver (Ag), gold (Au), platinum (Pt), tin (Sn), tungsten (W), titanium (Ti) and an alloy thereof, and the present disclosure is not limited thereto.

The internal electrodes 121 and 122 may be formed by applying a conductive paste for internal electrodes containing a conductive metal to a predetermined thickness on the ceramic green sheet and firing the same. A method of printing the conductive paste for an internal electrode may be a screen printing method, a gravure printing method or the like, and the present disclosure is not limited thereto.

An average thickness of the internal electrode may not need to be particularly limited. Here, the thickness of the internal electrode 121 or 122 may indicate a size of the internal electrodes 121 and 122 in the first direction. Meanwhile, the multilayer electronic component according to an exemplary embodiment of the present disclosure may satisfy $S_{1-2}>S_{1-1}$, $T_{1-2}\leq 8$ μm, $S_{2-2}>S_{2-1}$, and $T_{2-2}\leq 8$ μm thereby securing the moisture resistance reliability of the multilayer electronic component even when the average thickness of internal electrodes 121 and 122 is 0.4 μm or less.

Here, the average thickness of the dielectric layer 111 may be measured by scanning the cross sections of the body 110 in the first and second directions by using the scanning electron microscope (SEM) with a magnification of 10,000. In more detail, an average thickness value of the internal electrodes 121 and 122 may be obtained by averaging the thicknesses of one internal electrode measured at a plurality of points, for example, at thirty equally spaced points in the second direction. The thirty equally spaced points may be designated in the capacitance formation portion AC described below. In addition, it is possible to obtain a more general average thickness of the internal electrodes 121 and 122 when measuring its average value by extending a measurement target of the average value to ten internal electrodes 121 and 122.

The body 110 may include a capacitance formation portion AC disposed in the body 110, and including the first and second internal electrodes 121 and 122 opposing each other while having the dielectric layer 111 interposed therebetween to form capacitance of the multilayer electronic component, and a first cover portion 112 and a second cover portion 113 disposed on both end surfaces of the capacitance formation portion AC, opposing each other in the first direction. The cover portions 112 and 113 may basically prevent the internal electrode from being damaged due to physical or chemical stress. The cover portions 112 and 113 may have the same configuration as the dielectric layer 111 except that they do not include internal electrodes.

An average thickness of the cover portion may not need to be particularly limited. However, 20 μm or less may be the average thickness of the cover portion for the smaller size and higher capacitance of the multilayer electronic component. As described above, the multilayer electronic component 100 may secure its moisture resistance reliability by satisfying $S_{1-2}>S_{1-1}$, $T_{1-2}\leq 8$ μm, $S_{2-2}>S_{2-1}$, and $T_{2-2}\leq 8$ μm even when an average thickness tc of the cover portion is 20 μm or less.

The average thickness of the cover portion may indicate the average thickness of each of the first cover portion 112 and the second cover portion 113. The average thickness of the cover portions 112 and 113 may indicate the average size of the cover portions 112 and 113 in the first direction, and may be obtained by averaging its sizes in the first direction, measured at five equally spaced points in cross sections of the body 110 in the first and second directions.

The body 110 may include margin portions 114 and 115 disposed on both side surfaces of the capacitance formation portion AC, opposing each other in the third direction. That is, the margin portions 114 and 115 may indicate a region between ends of the internal electrodes 121 and 122 and the boundary surface of the body 110 in the cross-section of the body 110 in the first and third directions. Here, the margin portion may include the first margin portion 114 disposed on the fifth surface 5 of the body 110 and the second margin portion 115 disposed on the sixth surface 6 of the body 110.

The margin portions 114 and 115 may include the same material as the dielectric layer 111 except that the margin portions do not include the internal electrodes 121 and 122. The margin portions 114 and 115 may basically prevent the internal electrode from being damaged due to the physical or chemical stress.

The margin portions 114 and 115 may be formed by coating and sintering a conductive paste for internal electrodes on the ceramic green sheet, except where the margin portion is to be formed. Alternatively, the margin portions 114 and 115 may be formed by stacking one dielectric layer or two or more dielectric layers on each of two end surfaces of the capacitance formation portion AC, opposing each other in the third direction to suppress a step difference occurring due to the internal electrodes 121 and 122.

An average thickness of the margin portions 114 and 115 may not need to be particularly limited. However, the average thickness of the margin portions 114 and 115 may be 20 μm or less for the smaller size and higher capacitance of the multilayer electronic component. As described above, the multilayer electronic component 100 may secure its moisture resistance reliability by satisfying $S_{1-2}>S_{1-1}$, $T_{1-2}\leq 8$ μm, $S_{2-2}>S_{2-1}$, and $T_{2-2}\leq 8$ μm even when the average thickness of the margin portions 114 and 115 is 20 μm or less.

The average thickness of the margin portions 114 and 115 may indicate the average thickness of each of the first marginal portion 114 and the second margin portion 115. The average thickness of the margin portions 114 and 115 may indicate an average size of the margin portions 114 and 115 in the third direction, and may be obtained by averaging its sizes in the third direction, measured at five equally spaced points in the cross sections of the body 110 in the first and third directions.

The external electrodes 131 and 132 may be disposed on the third and fourth surfaces 3 and 4 of the body 110, and include the first external electrode 131 and the second external electrode 132 respectively connected to the plurality of first internal electrodes 121 and the plurality of second internal electrodes 122.

The first external electrode 131 may include the 1-1-th electrode layer 131-1 disposed on the third surface 3, the 1-2-th electrode layer 131-2 disposed on the first and second surfaces 1 and 2 to be connected to the 1-1-th electrode layer, and a 1-3-th electrode layer 131-3 disposed on the 1-1-th electrode layer and extending onto the 1-2-th electrode layer. Meanwhile, the 1-2-th electrode layer 131-2 may also be disposed on the fifth and sixth surfaces 5 and 6.

The second external electrode 132 may include the 2-2-th electrode layer 132-1 disposed on the fourth surface 4, the 2-2-th electrode layer 132-2 disposed on the first and second surfaces 1 and 2 to be connected to the 2-1-th electrode layer, and a 2-3-th electrode layer 132-3 disposed on the 2-1-th electrode layer and extending onto the 2-2-th electrode layer. Meanwhile, the 2-2-th electrode layer 132-2 may also be disposed on the fifth and sixth surfaces 5 and 6.

The 1-1-th electrode layer 131-1 and the 2-1-th electrode layer 132-1 may connect the internal electrodes 121 and 122 with the external electrodes 131 and 132, for example. In an exemplary embodiment, the 1-1-th electrode layer 131-1 and the 2-1-th electrode layer 132-1 may be disposed between an extension line E1 of the first surface 1 and an extension line E2 of the second surface 2. Accordingly, the capacitance per unit volume of the multilayer electronic component may be improved by reducing its size in the first direction. Here, the extension line of each surface may indicate a line extended based on a flat portion of each surface. Accordingly, an end of the 1-1-th electrode layer 131-1 may be disposed on the 1-3-th corner C1-3 and the 2-3-th corner C2-3, and an end of the 2-1-th electrode layer 132-1 may be disposed on the 1-4-th corner C1-4 and the 2-4-th corner C2-4. However, the present disclosure is not limited thereto, and the ends of the 1-1-th electrode layer 131-1 and the 2-1-th electrode layer 132-1 may be disposed on the cover portions 112 and 113 and/or the margin portions 114 and 115.

In an exemplary embodiment, the 1-1-th electrode layer 131-1 may include a region disposed on the third surface 3, and not covered by the 1-2-th electrode layer 131-2, and the 2-1-th electrode layer 132-1 may include a region disposed on the fourth surface 4, and not covered by the 2-2-th electrode layer 132-2. It is thus possible to reduce a thickness of the first external electrode 131 disposed on the third surface 3 and reduce a thickness of the second external electrode 132 disposed on the fourth surface 4 to thus reduce a size of the multilayer electronic component in the second direction, thereby improving its capacitance per unit volume.

A metal may be included in each of the 1-1-th electrode layer 131-1, the 1-2-th electrode layer 131-2, the 1-3-th electrode layer 131-3, the 2-1-th electrode layer 132-1, the 2-2-th electrode layer 132-2, and the 2-3-th electrode layer 132-3. The metal included in the 1-1-th electrode layer 131-1 and the 2-1-th electrode layer 132-1 may include, for example, at least one of copper (Cu), nickel (Ni), chromium (Cr), tin (Sn), palladium (Pd), and an alloy thereof. However, the present disclosure is not limited thereto. The metal included in the 1-2-th electrode layer 131-2 and the 2-2-th electrode layer 132-2 may include at least one of copper (Cu), nickel (Ni), silver (Ag), tin (Sn), chromium (Cr), and an alloy thereof. However, the present disclosure is not limited thereto.

The metals included in the 1-1-th electrode layer 131-1 and the 1-2-th electrode layer 131-2 may be the same as each other or different from each other, and the metals included as main elements may be different from each other. Similarly, the metals included in the 2-1-th electrode layer 132-1 and the 2-2-th electrode layer 132-2 may be the same as each other or different from each other, and the metals included as the main elements may be different from each other. Here, the main element may indicate an element with the highest atomic percentage (at %).

The 1-2-th electrode layer 131-2 and 2-2-th electrode layer 132-2 may each include glass. Glass may include, for example, at least one oxide of barium (Ba), calcium (Ca), aluminum (Al), boron (B), and silicon (Si), and the present disclosure is not limited thereto. Glass included in the 1-2-th electrode layer 131-2 and the 2-2-th electrode layer 132-2 may improve the bonding strength between the body 110 and the external electrodes 131 and 132.

According to an exemplary embodiment of the present disclosure, based on the cross sections of the first and second external electrodes 131 and 132 in the first and second directions, $S_{1-2}$, i.e. fraction of an area occupied by glass in the 1-2-th electrode layer 131-2 may be greater than $S_{1-1}$, i.e. fraction of an area occupied by glass in the 1-1-th electrode layer 131-1, $S_{2-2}$, i.e. fraction of an area occupied by glass in the 2-2-th electrode layer 132-2 may be greater than $S_{2-1}$, i.e. fraction of an area occupied by glass in the 2-1-th electrode layer 132-1. When the multilayer electronic component satisfies $S_{1-2} > S_{1-1}$ and $S_{2-2} > S_{2-1}$, the metals included in the first internal electrode 121 and the 1-1-th electrode layer 131-1, and in the second internal electrode 122 and the 2-1-th electrode layer 132-1, respectively, may easily form the alloy without interference of glass to thus block a hydrogen gas occurring during plating, thereby preventing a deterioration of high-temperature insulation resistance (IR). In this case, it is also possible to prevent glass included in the 1-1-th electrode layer 131-1 and the 2-1-th electrode layer 132-1 from being eroded by a plating solution to thus prevent external moisture from permeating into the internal electrodes 121 and 122 through the third and fourth surfaces 3 and 4, thereby improving the moisture resistance reliability of the multilayer electronic component. In addition, the 1-2-th electrode layer 131-2 and the 2-2-th electrode layer 132-2, having a larger area fraction of glass may be in direct contact with the first, second, fifth and/or sixth surface 1, 2, 5 and 6 of the body, thereby improving the bonding strength between the body 110 and the external electrodes 131 and 132.

In detail, $S_{1-2}$ and $S_{2-2}$ may satisfy, for example, $10\% < S_{1-2} \leq 30\%$ and $10\% < S_{2-2} \leq 30\%$. more preferably, $S_{1-2}$ and $S_{2-2}$ may satisfy $15\% \leq S_{1-2} \leq 30\%$ and $15\% \leq S_{2-2} \leq 30\%$. When $S_{1-2}$ and $S_{2-2}$ is 10% or less, the bonding strength between the body 110 and the external electrodes 131 and 132 may be insignificantly improved. On the other hand, when $S_{1-2}$ and $S_{2-2}$ is greater than 30%, the area fraction of glass may be excessive, and glass included in the 1-2-th electrode layer 131-2 and the 2-2-th electrode layer 132-2 may be eluted to outer surfaces of the 1-2-th electrode layer 131-2 and the 2-2-th electrode layer 132-2.

Meanwhile, a lower limit of $S_{1-1}$ or $S_{2-1}$ may not need to be particularly limited. That is, $S_{1-1}$ or $S_{2-1}$ may be greater than zero % to secure its bonding strength with the first, second, fifth, and/or sixth surface 1, 2, 5 and 6 of the body 110, and the present disclosure is not limited thereto.

For example, the 1-1-th electrode layer 131-1 and the 2-1-th electrode layer 132-1 may not include glass. In this case, the 1-1-th electrode layer 131-1 including no glass may be connected to the first internal electrode 121, and the 2-1-th electrode layer 132-1 including no glass may be connected to the second internal electrode 122, thereby further improving connectivity between the internal electrodes 121 and 122 and the external electrodes 131 and 132.

The 1-1-th electrode layer 131-1 and the 2-1-th electrode layer 132-1 may be formed by applying a first conductive paste including a metal on the third and fourth surfaces 3 and 4 of the body and then firing the same. In addition, the 1-2-th electrode layer 131-2 and the 2-2-th electrode layer 132-2 may be formed by applying a second conductive paste including a metal and glass having a higher content than that of the first conductive paste on the first, the second, the fifth and the sixth surface 1, 2, 5 and 6 and then firing the same. Meanwhile, when the 1-1-th electrode layer 131-1 and the 2-1-th electrode layer 132-1 includes no glass, the 1-1-th electrode layer and the 2-1-th electrode layer may be formed using an electrolytic plating method, an electroless plating method, a sputtering method, a vacuum deposition method and/or a chemical vapor deposition method. Accordingly, the 1-1-th electrode layer 131-1 and the 2-1-th electrode layer 132-1 may be a plating layer including at least one of copper (Cu), nickel (Ni), chromium (Cr), tin (Sn), palladium (Pd), and an alloy thereof. However, the present disclosure is not limited thereto.

Here, $S_{1-1}$, $S_{1-2}$, $S_{2-1}$ or $S_{2-2}$ may indicate a ratio of an area of a region where glass is disposed to a total area of a region where the metal is disposed and the region where glass is disposed, and may be expressed as in Equation 1 below.

$$S(\%) = ((\text{area of region where glass is disposed}) / ((\text{area of region where metal is disposed}) + (\text{area of region where glass is disposed}))) \times 100, \text{ where } S \text{ is } S_{1-1}, S_{1-2}, S_{2-1}, \text{ or } S_{2-2}. \quad \text{[Equation 1]}$$

That is, referring to FIG. 5, $S_{1-1}$ may indicate a ratio (%) of an area of a region where a 1-1-th glass G1-1 is disposed to a total area of a region where a 1-1-th metal M1-1 is disposed and the region where the 1-1-th glass G1-1 is disposed, in the 1-1-th electrode layer 131-1. In addition, referring to FIG. 6, $S_{1-2}$ may indicate a ratio (%) of an area of a region where a 1-2-th glass G1-2 is disposed to a total area of a region where a 1-2-th metal M1-2 is disposed and the region where the 1-2-th glass G1-2 is disposed, in the 1-2-th electrode layer 131-2.

The region where the metal is disposed and the region where glass is disposed may be distinguished from each other by obtaining a captured image of a cross section of the first and second external electrodes 131 and 132 in the first or second direction, cut from a center of the body 110 in the third direction, by using the scanning electron microscope (SEM) with a magnification of 3,000 times or more, and then analyzing an element in the image by using an energy dispersive spectroscopy (EDS). That is, in the cross section of the first and second external electrodes 131 and 132 in the first and second directions, a region where an element included in glass, for example, at least one element of barium (Ba), calcium (Ca), aluminum (Al), boron (B), and silicon (Si), is detected may be determined as the region where glass is disposed, and the area fraction of glass may thus be measured. In addition, the region where the metal is disposed and the region where glass is disposed may have different colors or shades in the image captured using the scanning electron microscope (SEM), through which the area fraction of glass may also be measured.

Meanwhile, as shown in FIG. 5 or 6, $S_{1-1}$ may be measured at a central region of the 1-1-th electrode layer 131-1 in the first direction, and $S_{1-2}$ may be measured at the central region of the 1-2-th electrode layer 131-2 in the second direction. Similarly, $S_{2-1}$ may be measured at a central region of the 2-1-th electrode layer 132-1 in the first direction, and $S_{2-2}$ may be measured at the central region of the 2-2-th electrode layer 132-2 in the second direction.

According to an exemplary embodiment of the present disclosure, a thickness $T_{1-2}$ of the central region of the 1-2-th electrode layer 131-2 in the second direction may be 8 μm or less, and a thickness T2-2 of the central region of the 2-2-th electrode layer 132-2 in the second direction may be 8 μm or less. When the thicknesses of the central regions of the 1-2-th electrode layer 131-2 and that of the 2-2-th electrode layer 132-2, having a larger area fraction of glass, are greater than 8 μm, the blister defect may occur on the external electrodes as residual carbon occurring in glass during the firing fails to be externally discharged. On the other hand, the multilayer electronic component 100 according to an exemplary embodiment of the present disclosure may satisfy $T_{1-2} \leq 8$ μm or $T_{2-2} \leq 8$ μm to allow residual carbon occurring in glass during the firing to be externally discharged easily, thereby preventing the blister defect from occurring on the external electrodes while improving the bonding strength between the body and the external electrodes.

$T_{1-2}$ or $T_{2-2}$ may be measured from a scanned image of the cross section of the first and second external electrodes 131 and 132 in the first and second directions, cut from the center of the body 110 in the third direction, by using the scanning electron microscope (SEM) with a magnification of 2,000 times or more. The central region of the 1-2-th electrode layer 131-2 in the second direction may indicate a region disposed in the center of regions where the 1-2-th electrode layer 131-2 is divided into 5 regions in the second direction in the image scanned using the scanning electron microscope (SEM). In addition, the central region of the 2-2-th electrode layer 132-2 in the second direction may indicate a region disposed in the center of regions where the 2-2-th electrode layer 132-2 is divided into 5 regions in the second direction in the image scanned using the scanning electron microscope (SEM). In addition, $T_{1-2}$ may indicate a maximum value in the central region of the 1-2-th electrode layer 131-2 in the second direction, and $T_{2-2}$ may indicate a maximum value in the central region of the 2-2-th electrode layer 132-2 in the second direction.

The 1-3-th electrode layer 131-3 and the 2-3-th electrode layer 132-3 may improve a mounting characteristic of the multilayer electronic component. The 1-3-th electrode layer and the 2-3-th electrode layer are not limited to a particular type, may be plating layers including nickel (Ni), tin (Sn), palladium (Pd), or an alloy including the same, and may be formed of a plurality of layers.

The 1-3-th electrode layer 131-3 and the 2-3-th electrode layer 132-3 may be, for example, nickel (Ni) plating layers or tin (Sn) plating layers, or may be made by sequentially forming the nickel (Ni) plating layer and the tin (Sn) plating layer. Alternatively, the 1-3-th electrode layer 131-3 and the 2-3-th electrode layer 132-3 may include a plurality of nickel (Ni) plating layers and/or a plurality of tin (Sn) plating layers.

Figure 7:
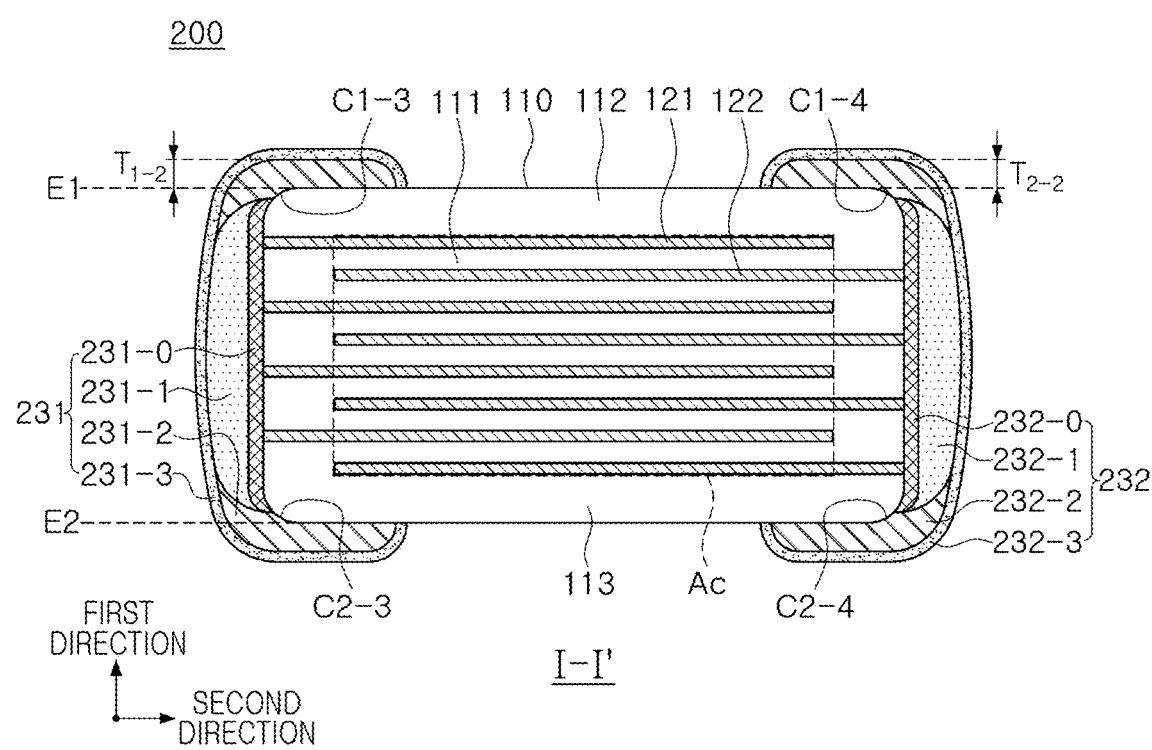
FIG. 7 is a view showing a modified example of FIG. 2.

FIG. 7 is a view showing a modified example of FIG. 2. Referring to FIG. 7, a multilayer electronic component 200 in another example of the present disclosure may further includes a first base electrode layer 231-0 disposed between the third surface 3 and the 1-1-th electrode layer 231-1 and connected to the first internal electrodes 121, and a second base electrode layer 232-0 disposed between the fourth surface 4 and the 2-1-th electrode layer 232-1 and connected to the second internal electrode 122.

Instead of the 1-1-th electrode layer and the 2-1-th electrode layer, the first base electrode layer 231-0 and the second base electrode layer 232-0 may connect the internal electrodes 121 and 122 with the external electrodes 131 and 132. Meanwhile, the first and second base electrode layer 231-0 and 232-0 may be substantially made of the metal. Here, the fact that the first and second base electrode layer 231-0 and 232-0 may be substantially made of the metal may indicate that the area fractions of the metal included in the first base electrode layer 231-0 and the second base electrode layer 232-0 may be 99% or more.

The first and second base electrode layer 231-0 and 232-0 may not include glass. The first and second base electrode layers including no glass may improve the connectivity between the internal electrodes 121 and 122 and the first and second base electrode layer, and prevent the erosion of glass occurring due to the plating solution, thus improving moisture resistance reliability of the multilayer electronic component 200.

Meanwhile, it may be sufficient for the first base electrode layer 231-0 and the second base electrode layer 232-0 to connect the internal electrodes with the external electrodes. It may thus be sufficient for the first base electrode layer 231-0 and the second base electrode layer 232-0 to cover both the side surfaces of the capacitance formation portion AC, opposing each other in the second direction. Accordingly, an end of the first base electrode layer 231-0 and an end of the second basic electrode layer 232-0 may be disposed on the cover portions 112 and 113 and/or the margin portions 114 and 115.

The end of the first base electrode layer 231-0 may be disposed on the 1-3-th corner C1-3 and the 2-3-th corner C2-3, and the end of the second base electrode layer 232-0 may be disposed on the 1-4-th corner C1-4 and the 2-4-th corner C2-4. The ends of the first and second base electrode layer may cover the corner of the body 110, thus more effectively prevent the plating solution or external moisture from permeating into the internal electrodes through the corner of the body. In addition, the first and second basic electrode layers may not extend onto none of the first, second, fifth, and sixth surfaces 1, 2, 5 and 6 to thus improve capacitance per unit volume of the multilayer electronic component 200.

The first base electrode layer 231-0 and the second basic electrode layer 232-0 may include at least one of copper (Cu), nickel (Ni), chromium (Cr), tin (Sn), palladium (Pd) or an alloy thereof, and may be formed using an electrolytic plating method, an electroless plating method, a sputtering method, a vacuum deposition method, and/or a chemical vapor deposition method. The first and second basic electrode layer may be plating layers, but the present disclosure is not limited thereto.

Hereinafter, the description describes a multilayer electronic component according to another exemplary embodiment of the present disclosure. However, the multilayer electronic component according to another exemplary embodiment of the present disclosure may have the same configuration as the multilayer electronic component according to an exemplary embodiment of the present disclosure described above. Therefore, the description omits a description overlapping the above-described description of an exemplary embodiment of the present disclosure.

A multilayer electronic component 100 according to an exemplary embodiment of the present disclosure may include: a body 110 including a dielectric layer 111 and first and second internal electrodes 121 and 122 alternately disposed with the dielectric layer 111 interposed therebetween and including first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction, a first external electrode 131 including a 1-1-th electrode layer 131-1 disposed on the third surface 3, and a 1-2-th electrode layer 131-2 disposed on the first and second surfaces 1 and 2 to be connected to the 1-1-th electrode layer and including glass, and a second external electrode 132 including a 2-1-th electrode layer 132-1 disposed on the fourth surface 4, and a 2-2-th electrode layer 132-2 disposed on the first and second surfaces 1 and 2 to be connected to the 2-1-th electrode layer and including glass, wherein $10\% < S_{1-2} \leq 30\%$, $S_{1-2} > S_{1-1}$, $10\% < S_{2-2} \leq 30\%$, and $S_{2-2} > S_{2-1}$ where based on a cross section of the first and second external electrodes 131 and 132 in the first and second directions, $S_{1-1}$ is a fraction of an area occupied by glass in the 1-1-th electrode layer 131-1, $S_{1-2}$ is the fraction of an area occupied by glass in the 1-2-th electrode layer 131-2, $S_{2-1}$ is the fraction of an area occupied by glass in the 2-1-th electrode layer 132-1, and $S_{2-2}$ is the fraction of an area occupied by glass in the 2-2-th electrode layer 132-2.

As described above, when the multilayer electronic component satisfies $S_{1-2} > S_{1-1}$ and $S_{2-2} > S_{2-1}$, metals included in the first internal electrode 121 and the 1-1-th electrode layer 131-1, and in the second internal electrode 122 and the 2-1-th electrode layer 132-1, respectively, may easily form an alloy without interference of glass to thus block a hydrogen gas occurring during plating, thereby preventing a deterioration of high-temperature insulation resistance (IR). In addition, it is also possible to prevent glass included in the 1-1-th electrode layer 131-1 and the 2-1-th electrode layer 132-1 from being eroded by a plating solution to thus prevent external moisture from permeating into the internal electrodes 121 and 122 through the third and fourth surface, thereby improving moisture resistance reliability of the multilayer electronic component.

In addition, the 1-2-th electrode layer 131-2 and the 2-2-th electrode layer 132-2, having a larger area fraction of glass may be in direct contact with the first, second, fifth or sixth surface 1, 2, 5 and 6 of the body, thereby improving a bonding strength between the body 110 and the external electrodes 131 and 132. Meanwhile, when $S_{1-2}$ or $S_{2-2}$ is 10% or less, the bonding strength between the body 110 and the external electrodes 131 and 132 may be insignificantly improved. On the other hand, when $S_{1-2}$ or $S_{2-2}$ is more than 30%, the area fraction of glass may be excessive, and glass included in the 1-2-th electrode layer 131-2 and the 2-2-th electrode layer 132-2 may be eluted to an outer surfaces of the 1-2-th electrode layer 131-2 and the 2-2-th electrode layer 132-2. Meanwhile, more preferably, $S_{1-2}$ and $S_{2-2}$ may satisfy $15\% \leq S_{1-2} \leq 30\%$ or $15\% \leq S_{2-2} \leq 30\%$.

Inventive Example

Blister Evaluation Under Condition of $T_{1-2} \leq 8$ μm and $T_{2-2} \leq 8$ μm The body including the dielectric layers and the internal electrodes may be first prepared, and the 1-1-th electrode layer and the 2-1-th electrode layer are then respectively formed on the third and fourth surfaces of the body through the plating. The second conductive paste including the metal and glass is then applied to the first, second, fifth, and sixth surfaces of the body, and then fired. In this way, the 1-2-th electrode layer and the 2-2-th electrode layer are formed to prepare a sample chip including the first and second external electrodes.

Next, the thickness $T_{1-2}$ of the central region of the 1-2-th electrode layer in the second direction and the thickness $T_{2-2}$ of the central region of the 2-2-th electrode layer in the second direction are measured from the scanned image of the cross section of the first and second external electrode in the first and second directions, cut from the center of the body in the third direction, by using the scanning electron microscope (SEM) with a magnification of 2,000 magnification. $T_{1-2}$ is measured at the region disposed in the center of the regions where the 1-2-th electrode layer is divided into 5 regions in the second direction, and $T_{2-2}$ is measured at the region disposed in the center of the regions where the 2-2-th electrode layer is divided into 5 regions in the second direction. In addition, $T_{1-2}$ is set to the maximum value in the central region of the 1-2-th electrode layer 131-2 in the second direction, and $T_{2-2}$ is set to the maximum value in the central region of the 2-2-th electrode layer 132-2 in the second direction. Here, $T_{1-2}$ and $T_{2-2}$ of the experimental example are respectively adjusted to 8 μm or less, and $T_{1-2}$ and $T_{2-2}$ of a comparative example are respectively adjusted to 10 μm or more.

Figure 8:
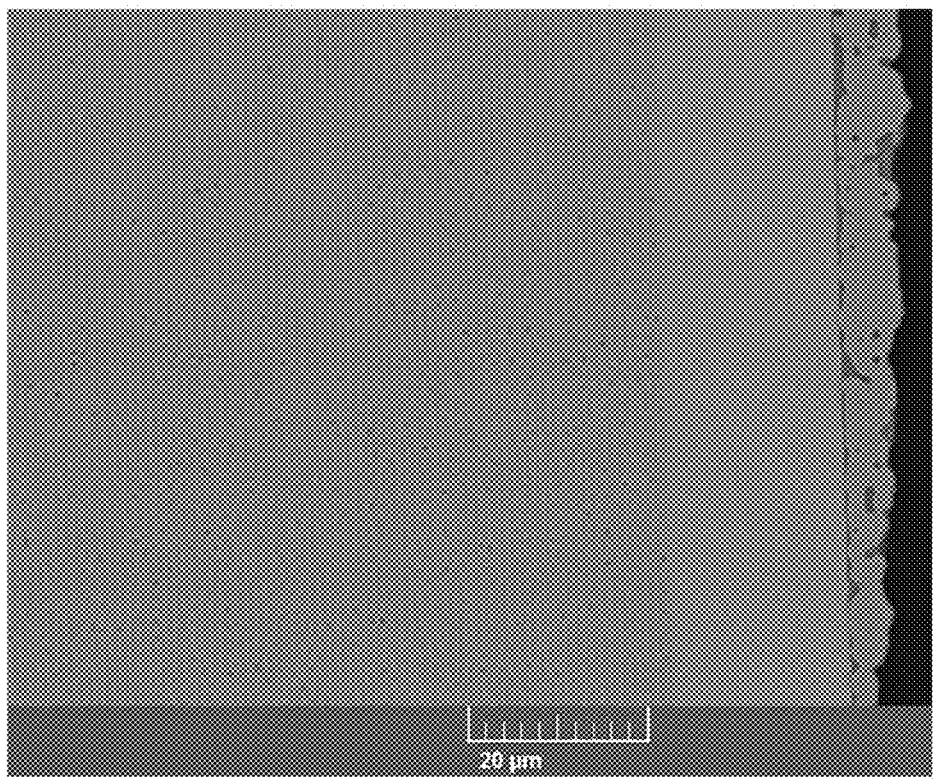
FIG. 8 is an image captured by a scanning electron microscope and showing a cross section of an external electrode in an experimental example.
Figure 9:
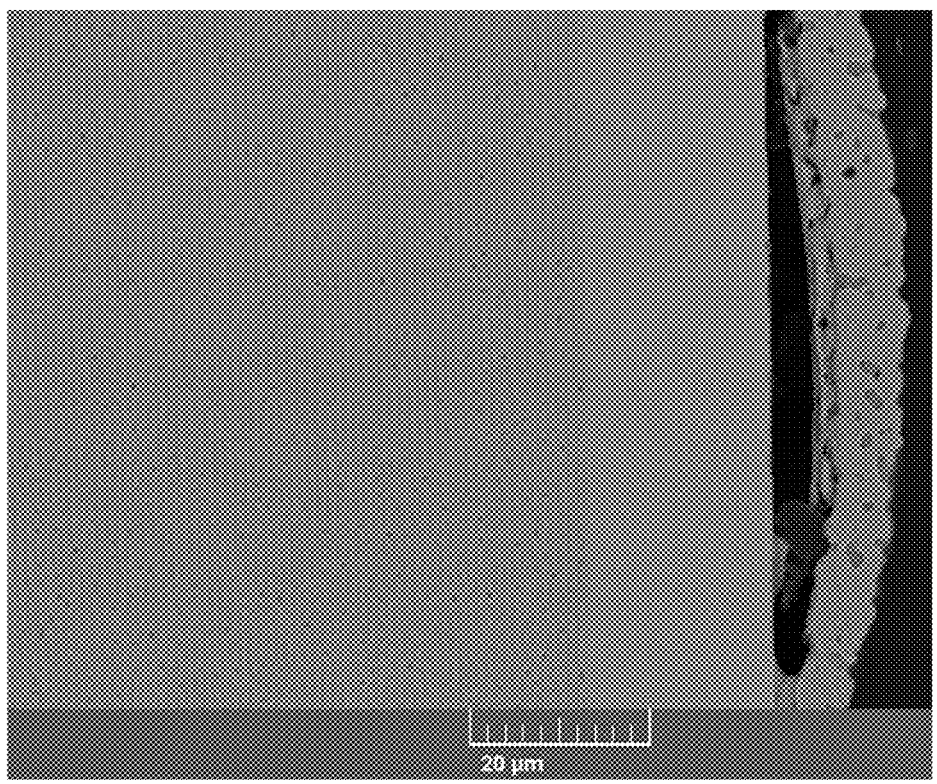
FIG. 9 is an image captured by a scanning electron microscope and showing a cross section of an external electrode in a comparative example.

FIG. 8 is an image captured by the scanning electron microscope and showing the cross section of the external electrode in the experimental example. FIG. 9 is an image captured by the scanning electron microscope and showing a cross section of an external electrode in the comparative example. Referring to FIGS. 8 and 9, in the comparative example in which $T_{1-2}$ and $T_{2-2}$ each have the thickness of 10 μm or more, the blister defect occurs on the external electrode, and a portion of the external electrode is thus detached from the body. The reason is probably that the thicknesses of the central regions of the 1-2-th electrode layer and 2-2-th electrode layer in the second direction is excessive, thus preventing residual carbon occurring in glass during the firing from being externally discharged. On the other hand, in the experimental example, $T_{1-2}$ and $T_{2-2}$ each have the thickness of 8 μm or less, thus allowing residual carbon occurring in glass during the firing to be externally discharged easily, thereby preventing the blister defect from occurring on the external electrode.

<Evaluations of Bonding Strength Between Body and External Electrode and Elution of Glass Under Condition of $10\% < S_{1-2} \leq 30\%$ or $10\% < S_{2-2} \leq 30\%$>

Next, the captured image of the cross section of the first and second external electrode, cut from the center of the body in the third direction, by using the scanning electron microscope (SEM) with a magnification of 5,000 times are obtained, and the SEM image is analyzed to measure $S_{1-1}$, $S_{1-2}$, $S_{2-1}$, and $S_{2-2}$. $S_{1-1}$ and $S_{2-1}$ are measured at the central regions of the 1-1-th electrode layer and the 2-1-th electrode layer in the first direction, and $S_{1-2}$ and $S_{2-2}$ are measured at the central regions of the 1-2-th electrode layer and the 2-2-th electrode layer in the second direction.

Here, the 1-1-th electrode layer and the 2-1-th electrode layer are formed by plating, and $S_{1-1}$ and $S_{2-1}$ are less than 0.1%. $S_{1-2}$ and $S_{2-2}$ for 10 samples for each test number are respectively measured, and an average value of $S_{1-2}$ and an average value of $S_{2-2}$ are then described in Table 1 below.

A tape test is performed to test the bonding strength between the body and the external electrodes by mounting 100 samples for each test number while the first or second surface of which faces a board, attaching an adhesive tape having an adhesive strength of 1600 gf/25 mm, when measured at 300 mm/min speed and 90° angle at 25° C. to a surface of the sample chip, and then applying a force at an angle of 90° to separate the tape from the surface of the chip. The attachment and detachment of the adhesive tape for each sample are repeated 5 times. The number of sample chips from which the 1-2-th electrode layer and the 2-2-th electrode layer are removed by the adhesive tape is then measured and listed in Table 1 below.

In addition, a glass elution test is performed as follows: for 30 samples for each test number, each scanned image of the cross section of the first and second external electrode in the first and second directions, cut from the center of the body in the third direction, is observed using the scanning microscope electron (SEM) with the magnification of 2,000; and the number of sample chips in which glass is eluted to the outer surfaces of the 1-2-th electrode layer and the 2-2-th electrode layer is here measured and listed in Table 1 below.

TABLE 1

| Test no. | $S_{1-2}$ ($S_{2-2}$) | Tape test | Glass elution test |
|---|---|---|---|
| 1 | 8% | 87/100 | 0/30 |
| 2 | 10% | 33/100 | 0/30 |
| 3 | 15% | 0/100 | 0/30 |
| 4 | 20% | 0/100 | 0/30 |
| 5 | 25% | 0/100 | 0/30 |
| 6 | 30% | 0/100 | 0/30 |
| 7 | 35% | 0/100 | 6/30 |
| 8 | 40% | 0/100 | 17/30 |

Referring to Test nos. 1 and 2 in Table 1 above, when $S_{1-2}$ and $S_{2-2}$ are 10% or less, the bonding strength between the body and the external electrodes is insignificantly improved, thus causing a defect in the tape test.

On the other hand, referring to Test nos. 7 and 8 in Table 1 above, when $S_{1-2}$ and $S_{2-2}$ are more than 30%, glass is eluted from the outer surfaces of the 1-2-th electrode layer and the 2-2-th electrode layer.

Meanwhile, referring to Test nos. 3 to 6, when $10\% < S_{1-2} \leq 30\%$ and $10\% < S_{2-2} \leq 30\%$, the bonding strength between the body and the external electrodes is secured, and excessive glass is prevented from being eluted to the outer surfaces of the 1-2-th electrode layer and the 2-2-th electrode layer, thus having no defect occurring in the tape test or the glass dissolution test.

As set forth above, the present disclosure may provide the multilayer electronic component with the improved moisture resistance reliability.

The present disclosure may also provide the multilayer electronic component with the improved bonding strength between the body and the external electrode.

The present disclosure may also provide the multilayer electronic component without the blister on the external electrode or the elution of glass to the outer surface of the external electrode.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
   a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
   a first external electrode including a 1-1-th electrode layer disposed on the third surface, and a 1-2-th electrode layer disposed on the first and second surfaces to be connected to the 1-1-th electrode layer and including glass; and
   a second external electrode including a 2-1-th electrode layer disposed on the fourth surface, and a 2-2-th electrode layer disposed on the first and second surfaces to be connected to the 2-1-th electrode layer and including glass,
   wherein $S_{1-2} > S_{1-1}$, $T_{1-2} \leq 8$ μm, $S_{2-2} > S_{2-1}$, and $T_{2-2} \leq 8$ μm where based on a cross section of the first and second external electrode in the first and second directions, $S_{1-1}$ is a fraction of an area occupied by the glass in the 1-1-th electrode layer, $S_{1-2}$ is a fraction of an area occupied by the glass in the 1-2-th electrode layer, $T_{1-2}$ is a thickness of a central region of the 1-2-th electrode layer in the second direction, $S_{2-1}$ is a fraction of an area occupied by the glass in the 2-1-th electrode layer, $S_{2-2}$ is a fraction of an area occupied by the glass in the 2-2-th electrode layer, and $T_{2-2}$ is a thickness of a central region of the 2-2-th electrode layer in the second direction.

2. The component of claim 1, wherein $S_{1-2}$ and $S_{2-2}$ satisfy $10\% < S_{1-2} \leq 30\%$ and $10\% < S_{2-2} \leq 30\%$.

3. The component of claim 1, wherein $S_{1-1}$ is measured at a central region of the 1-1-th electrode layer in the first direction, $S_{1-2}$ is measured at the central region of the 1-2-th electrode layer in the second direction,
   $S_{2-1}$ is measured at a central region of the 2-1-th electrode layer in the first direction, and $S_{2-2}$ is measured at the central region of the 2-2-th electrode layer in the second direction.

4. The component of claim 1, wherein the 1-1-th electrode layer and the 2-1-th electrode layer do not include glass.

5. The component of claim 1, wherein the 1-1-th electrode layer and the 2-1-th electrode layer are disposed between an extension line of the first surface and an extension line of the second surface.

6. The component of claim 1, wherein the first external electrode further includes a 1-3-th electrode layer disposed on the 1-1-th electrode layer and extending onto the 1-2-th electrode layer, and
   the second external electrode further includes a 2-3-th electrode layer disposed on the 2-1-th electrode layer and extending onto the 2-2-th electrode layer.

7. The component of claim 6, wherein each of the 1-1-th electrode layer, the 1-2-th electrode layer, the 1-3-th electrode layer, the 2-1-th electrode layer, the 2-2-th electrode layer, and the 2-3-th electrode layer includes a metal.

8. The component of claim 1, wherein the first external electrode further includes a first base electrode layer disposed between the third surface and the 1-1-th electrode layer and connected to the first internal electrode, and the second external electrode further includes a second base electrode layer disposed between the fourth surface and the 2-1-th electrode layer and connected to the second internal electrode.

9. The component of claim 8, wherein the first and second base electrode layer do not include glass.

10. The component of claim 8, wherein the body includes a 1-3-th corner connecting the first and third surface, a 1-4-th corner connecting the first and fourth surface, a 2-3-th corner connecting the second and third surface, and a 2-4-th corner connecting the second and fourth surface, an end of the first base electrode layer is disposed on the 1-3-th corner and the 2-3-th corner, and an end of the second base electrode layer is disposed on the 1-4-th corner and the 2-4-th corner.

11. A multilayer electronic component, the component comprising:

a body including a dielectric layer and first and second internal electrodes alternately disposed with the dielectric layer interposed therebetween and including first and second surfaces opposing each other in a first direction, third and fourth surfaces connected to the first and second surfaces and opposing each other in a second direction, and fifth and sixth surfaces connected to the first to fourth surfaces and opposing each other in a third direction;

a first external electrode including a 1-1-th electrode layer disposed on the third surface, and a 1-2-th electrode layer disposed on the first and second surfaces to be connected to the 1-1-th electrode layer and including glass; and a second external electrode including a 2-1-th electrode layer disposed on the fourth surface, and a 2-2-th electrode layer disposed on the first and second surfaces to be connected to the 2-1-th electrode layer and including glass, wherein $10\% < S_{1-2} \leq 30\%$, $S_{1-2} > S_{1-1}$, $10\% < S_{2-2} \leq 30\%$, and $S_{2-2} > S_{2-1}$ where based on a cross section of the first and second external electrode in the first and second directions, $S_{1-1}$ is a fraction of an area occupied by the glass in the 1-1-th electrode layer, $S_{1-2}$ is a fraction of an area occupied by the glass in the 1-2-th electrode layer, $S_{2-1}$ is a fraction of an area occupied by the glass in the 2-1-th electrode layer, and $S_{2-2}$ is a fraction of an area occupied by the glass in the 2-2-th electrode layer.

12. The component of claim 11, wherein the 1-1-th electrode layer and the 2-1-th electrode layer do not include glass.

13. The component of claim 11, wherein $S_{1-2}$ and $S_{2-2}$ satisfy $15\% \leq S_{1-2} \leq 30\%$ or $15\% \leq S_{2-2} \leq 30\%$.

* * * * *